April 24, 1928.

F. R. NIES

TRUCK

Filed May 25, 1926

1,667,671

Frederick R. Nies Inventor

By *[signature]*

Attorney

Patented Apr. 24, 1928.

1,667,671

UNITED STATES PATENT OFFICE.

FREDERICK R. NIES, OF LYNN, MASSACHUSETTS.

TRUCK.

Application filed May 25, 1926. Serial No. 111,655.

My invention relates to trucks and more particularly to the type designed for moving ash barrels and other heavy containers out of cellars, over stairs, and elsewhere. It has for its purposes to provide an improved combination drop axle and back rest, formed by the truck frame and adaptable to eliminate back sliding of the barrel when placed upon the truck, preventing barrel contact with the stairs or other uneven surfaces over which the truck is operated; to provide an improved frame, shaped so as to allow for the sliding thereon of a hook, designed to engage and secure in position on the truck barrels of varying heights; to provide new and novel truck handles positioned over and substantially at an angle of 90° to the axle; to materially strengthen truck construction; to center at the point of strain in use, the frame sides, the barrel holding hook, and the handle anchorage; to abolish so called cross bars heretofore secured to barrel trucks, the incidental riveting, and breakage in use; to provide a frame construction designed to hook over the truck axle when assembled; to minimize manufacturing parts, assembling operations, and production costs, by an improved construction to position the handle near the barrel top so as to secure a more direct lift than has heretofore been had; to provide in combination a wheeled truck with handles in line substantially parallel to the wheels; to provide in combination a barrel holder with, and adaptable to slide on an improved frame of a truck; and to secure the various other advantages and results made evident from the following specification.

Figure 1:
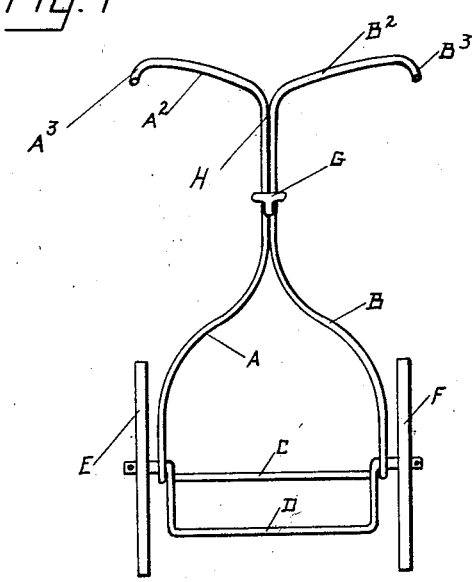
Figure 2:
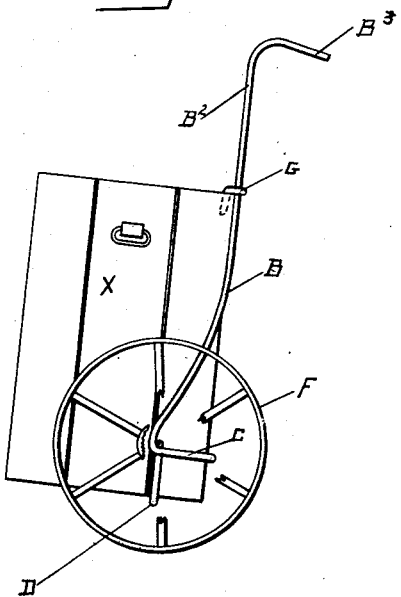
Figure 3:
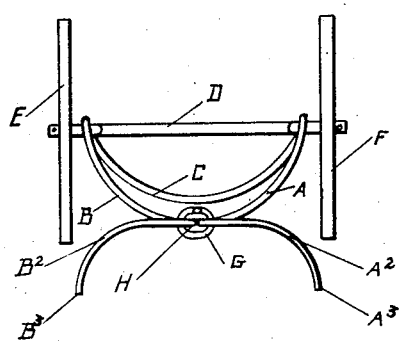
Figure 4:
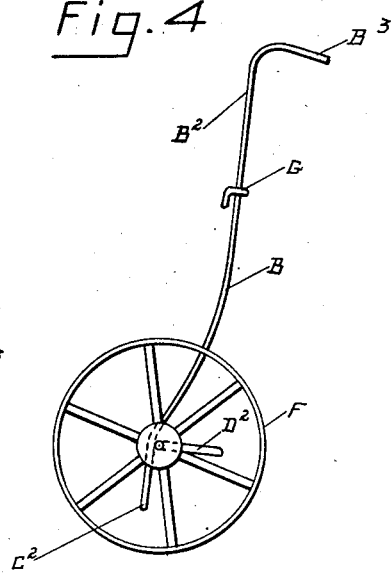

I accomplish the objects of my invention as shown in the accompanying drawings, which form a part of these specifications, and in which Figure 1 shows a front view of my improved truck. Figure 2 shows a side view, with a barrel X in position thereon. Figure 3 shows a top view, looking down on said truck. Figure 4 shows a varied truck construction in which the drop axle is raised to form a back rest and the frame is extended below the axle to form a transverse beam on which a barrel or load is intended to rest.

Referring again to the drawings, it will be seen that the truck is composed (1), of a frame having two side bars A and B and a transverse beam C, which forms a back rest in the model shown in Figures 1, 2 and 3, and forms a load support $C^2$ in the varied construction shown in Figure 4, (2) a U-shaped axle D which at its center position carries the load in the model shown in Figures 1, 2 and 3, and forms a back rest $D^2$, in the varied construction shown in Figure 4, (3) the wheels E and F, and (4) the hook G. H shows the point at which the handle bars $A^2$ and $B^2$ join. $A^3$ and $B^3$ show the handles.

Similar letters of reference refer to similar parts throughout the various views. I prefer to make my improved truck from metal tubing, welded at all joints, but it is evident that any suitable material may be used, or the joints otherwise secured. Particular stress is laid on the minimum number of parts used. The handles, handle bars, frame sides, and back rest are preferably made in one piece, joined and welded at the central point of strain, so as to maintain strict rigidity in use. The axle member is then welded in position, at an angle to give a barrel placed thereon perfect balance, and the wheels and barrel hook assembled all of which completes the truck.

I do not desire to limit myself to the specific details of construction herein set forth, but claim all such variations and equivalents as may well be construed to fall within the scope of the appended claims.

Having thus described my invention, I claim as new and desire to secure by Letters Patent of the United States of America:

1. A hand truck comprising a pair of wheels and an axle therefor formed with an intermediate bent portion for supporting a load, a frame for the truck bent to provide spaced side bars and a transverse supporting bar, said frame having portions thereof above the side bars lying together to provide a shank, and the ends of the frame being bent outwardly to form handles for the truck, said transverse supporting bar being off-set from the lower ends of the side bars, and engaging about and connected with the horizontal bearing portions of the axle, and said supporting bar and the bent portion of the axle cooperating to form a pocketing device for the load.

2. A hand truck comprising wheels and an axle therefor formed with a U-shaped bent portion intermediate its ends for supporting a load, a frame for the truck bent to provide spaced side bars, a transverse supporting bar, a shank and handle bars, said transverse supporting bar being laterally off-set from the lower ends of the side bars and engaging about and connected with the horizontal bearing portions of the axle, and said supporting bar and bent portion of the axle cooperating to form a pocketing device for the load.

3. A hand truck comprising wheels and a drop axle, the depending bent portion thereof adapted to support a load, a frame for the truck bent to provide spaced side bars, a transverse supporting bar, a shank and handle bars, said transverse supporting bar being laterally off-set from the lower ends of the side bars and engaging about and connected with the horizontal bearing portions of the axle, and said transverse supporting bar extending substantially at right angles to the depending bent portion of the axle to form a pocketing device for the load.

4. A hand truck comprising wheels and a drop axle, the depending bent portion thereof adapted to support a load, a frame for the truck bent to provide spaced side bars, a transverse supporting bar, a shank and handle bars, said transverse supporting bar being laterally off-set from the lower ends of the side bars and engaging about and connected with the horizontal bearing portions of the axle, the side bars being further bent to dispose the portions thereof adjacent the shank substantially aligned with the transverse supporting bar longitudinally of the truck, and said transverse supporting bar extending substantially at right angles to the depending bent portion of the axle to form a pocketing device for the load.

5. A hand truck comprising wheels and a drop axle, the U-shaped depending bent portion thereof adapted to support a load, a frame for the truck bent to provide spaced side bars, a U-shaped transverse supporting bar, a shank and handle bars, said U-shaped transverse supporting bar being laterally off-set from the lower ends of the side bars and engaging about and connected with the horizontal bearing portions of the axle, the side bars being further bent to dispose the portions thereof adjacent the shank substantially aligned with the transverse supporting bar longitudinally of the truck, and said transverse supporting bar extending substantially at right angles to the depending bent portion of the axle to form a pocketing device for the load.

In testimony whereof I affix my signature.

FREDERICK R. NIES.